(12) United States Patent
Levisse et al.

(10) Patent No.: US 11,885,265 B2
(45) Date of Patent: Jan. 30, 2024

(54) RECOVERY OF LUBRICATING OIL FROM A REDUCTION GEAR OF AN AIRCRAFT TURBINE ENGINE

(71) Applicant: Safran Aircraft Engines, Paris (FR)

(72) Inventors: Paul Ghislain Albert Levisse, Paris (FR); Olivier Belmonte, Paris (FR); Amelie Argie Antoinette Chassagne, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 43 days.

(21) Appl. No.: 17/783,634

(22) PCT Filed: Dec. 1, 2020

(86) PCT No.: PCT/FR2020/052231
§ 371 (c)(1),
(2) Date: Jun. 8, 2022

(87) PCT Pub. No.: WO2021/116557
PCT Pub. Date: Jun. 17, 2021

(65) Prior Publication Data
US 2023/0021913 A1    Jan. 26, 2023

(30) Foreign Application Priority Data
Dec. 10, 2019   (FR) ...................................... 1914016

(51) Int. Cl.
*F02C 7/06*      (2006.01)
*F02C 7/24*      (2006.01)
*F02C 7/36*      (2006.01)

(52) U.S. Cl.
CPC .................. *F02C 7/06* (2013.01); *F02C 7/24* (2013.01); *F02C 7/36* (2013.01); *F05D 2260/40311* (2013.01); *F05D 2260/602* (2013.01)

(58) Field of Classification Search
CPC .... F02C 7/06; F02C 7/36; F02C 3/067; F01D 25/18
See application file for complete search history.

(56) References Cited

U.S. PATENT DOCUMENTS

| 9,404,420 | B2* | 8/2016 | Gallet | ..................... F01D 25/18 |
| 2013/0223992 | A1* | 8/2013 | Suciu | ..................... F02C 3/067 415/122.1 |

(Continued)

FOREIGN PATENT DOCUMENTS

| EP | 2820280 | 1/2015 |
| EP | 3447243 | 2/2019 |
| FR | 3035375 | 10/2016 |

OTHER PUBLICATIONS

International Patent Application No. PCT/FR2020/052231, International Search Report dated Mar. 11, 2021, 2 pages.

*Primary Examiner* — David E Sosnowski
*Assistant Examiner* — Jackson N Gillenwaters
(74) *Attorney, Agent, or Firm* — Kilpatrick Townsend & Stockton LLP

(57) ABSTRACT

Aircraft turbine engine (10), comprising:—at least one first turbine rotor (22a) connected to a first turbine shaft (36) and comprising rotor blades located in a stream (V),—an annular exhaust casing (28) supporting at least one bearing (60, 62) for guiding the rotation of the first shaft and comprising arms (28a) located in the stream, downstream of the blades, and—a mechanical planetary gearbox (42) which comprises a sun gear (44), a ring gear (40) and a planet carrier (46), the gearbox being at least partially surrounded by the exhaust (Continued)

casing and one of the rotatable elements chosen from the sun gear and the ring gear being connected to the first shaft, characterised in that the exhaust casing carries a device (70) for recovering and discharging oil projected centrifugally by the reduction gear.

12 Claims, 7 Drawing Sheets

(56) References Cited

U.S. PATENT DOCUMENTS

| | | | |
|---|---|---|---|
| 2014/0124297 A1* | 5/2014 | Motto | F01D 25/20 |
| | | | 184/6.12 |
| 2016/0245116 A1* | 8/2016 | Belmonte | F01D 25/186 |
| 2017/0122122 A1* | 5/2017 | Lepretre | F02C 7/32 |
| 2017/0356306 A1* | 12/2017 | Lao | F16H 57/0421 |
| 2018/0163850 A1 | 6/2018 | Lao et al. | |
| 2019/0085715 A1* | 3/2019 | van der Merwe | F02C 3/067 |

\* cited by examiner

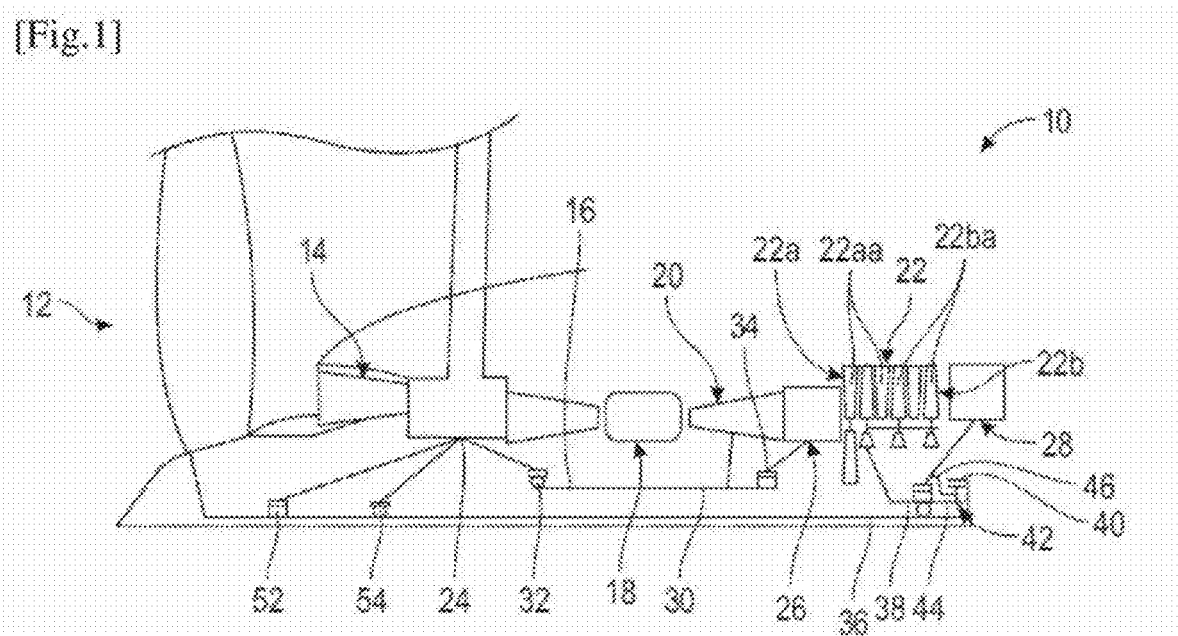
[Fig.1]
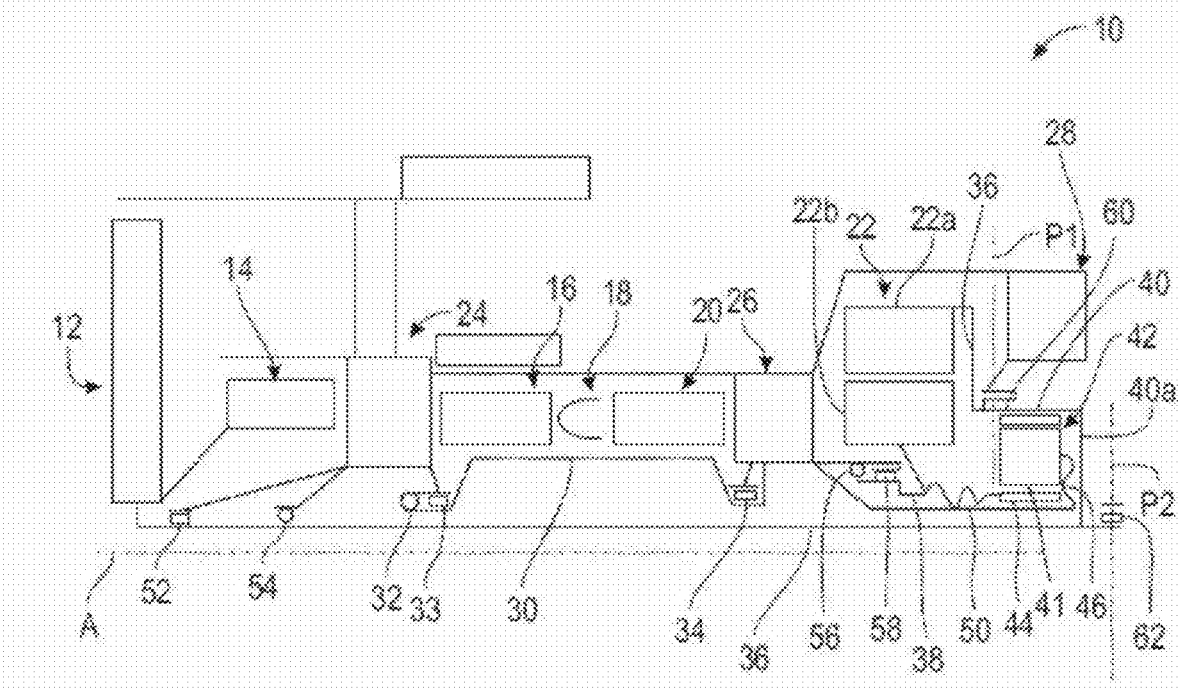
[Fig.2]

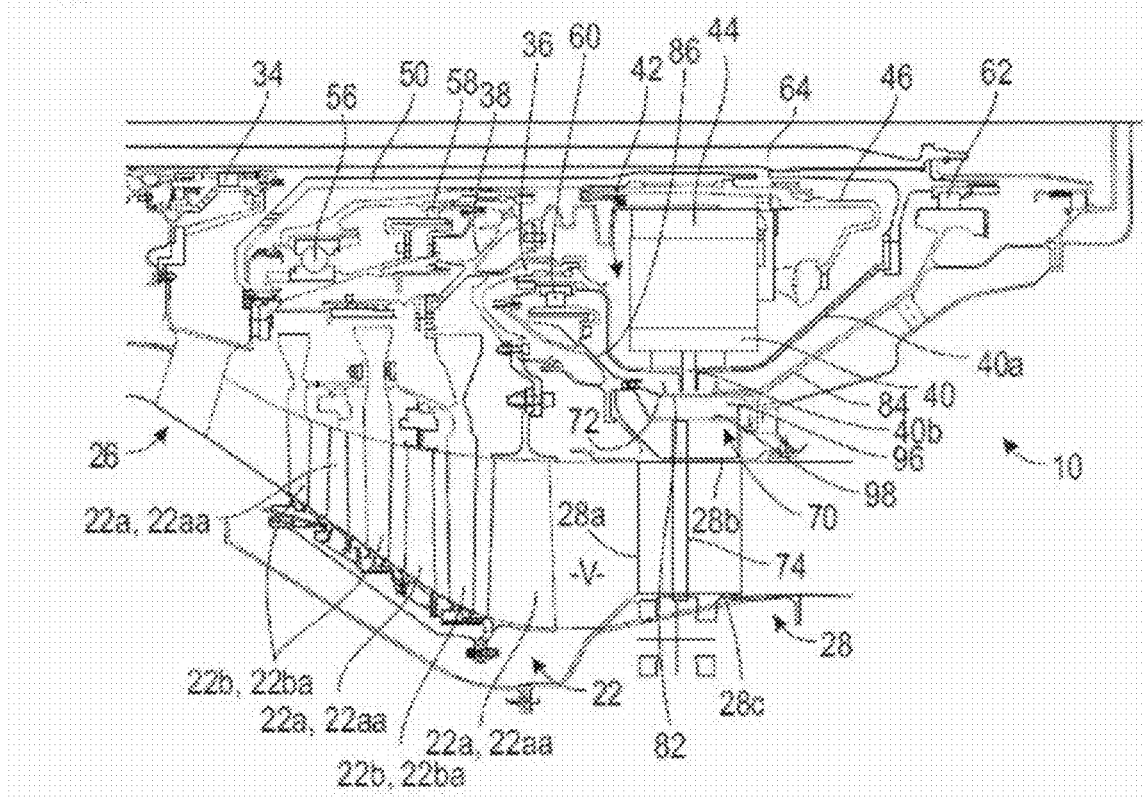

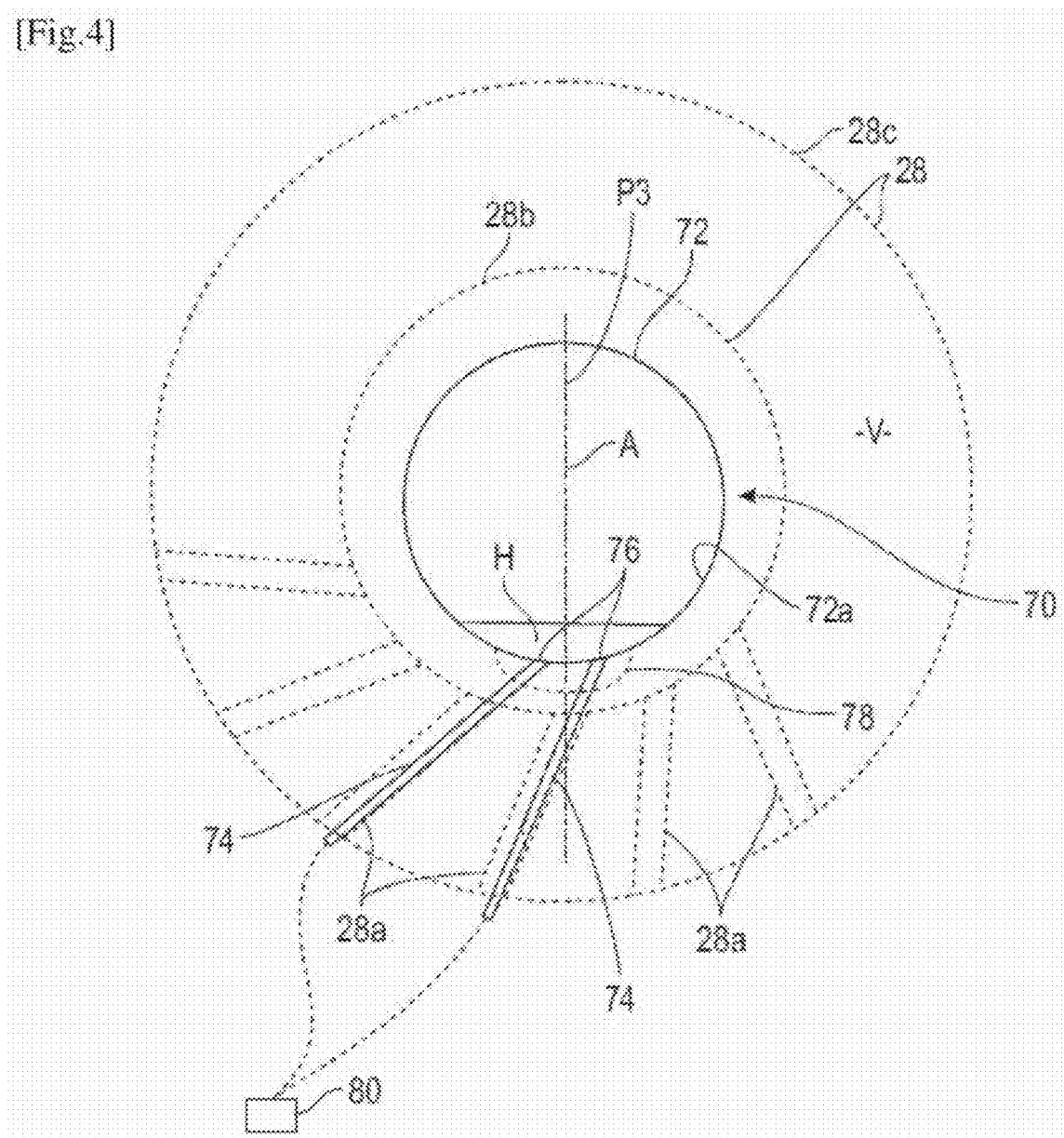
[Fig.4]

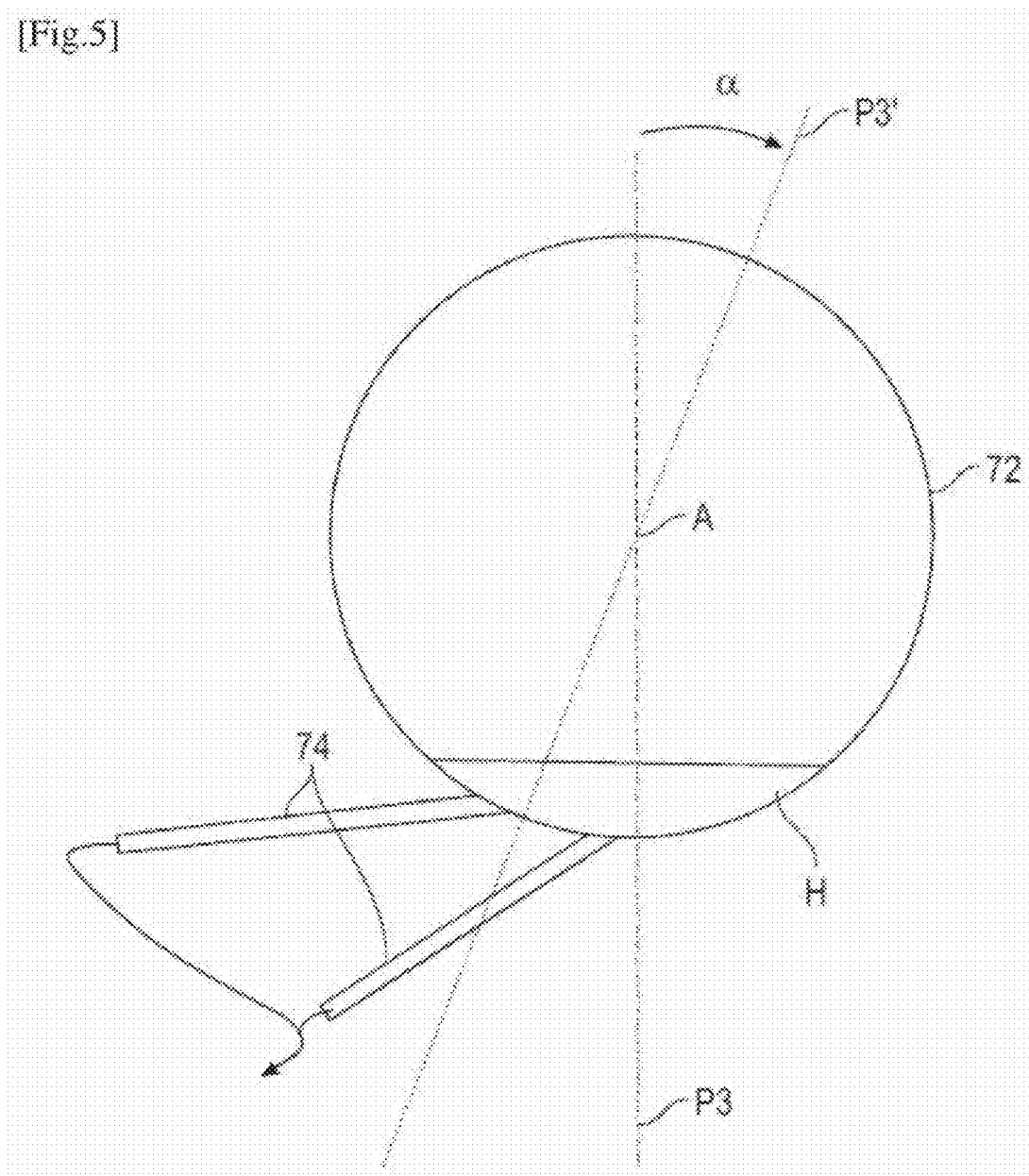
[Fig.5]

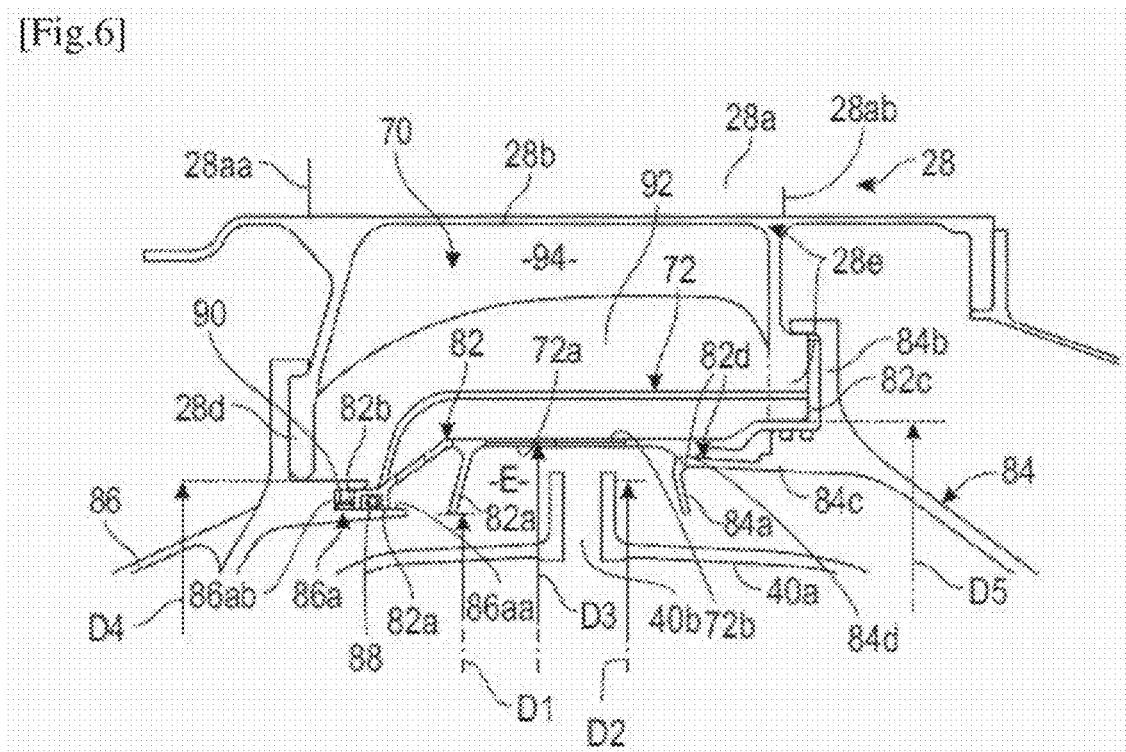

[Fig.7]
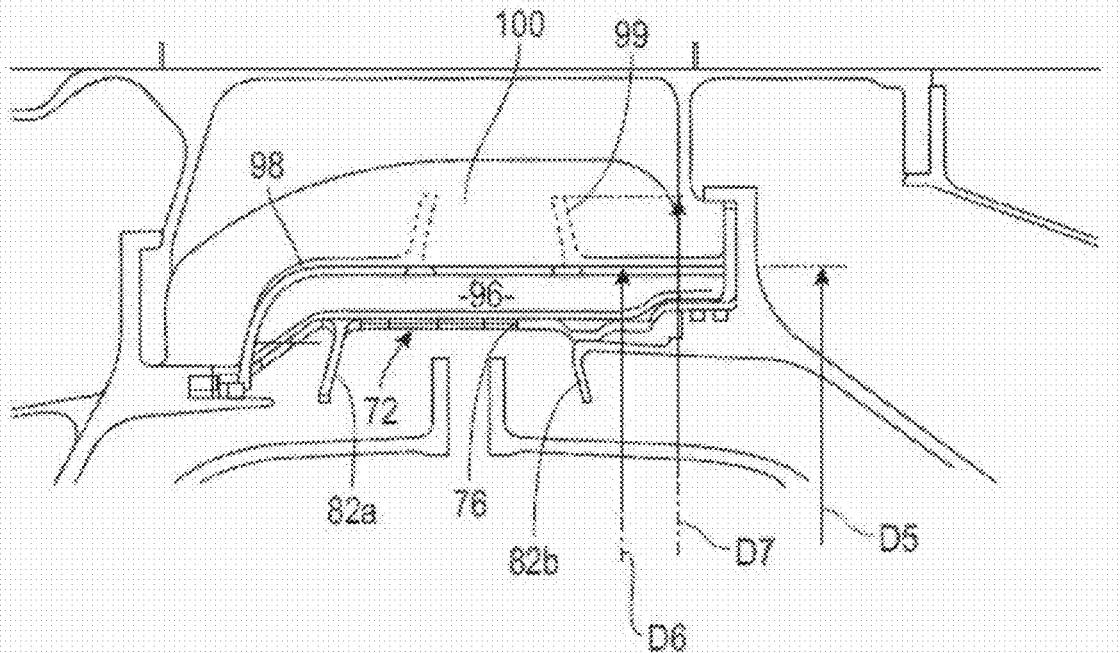
[Fig.8]
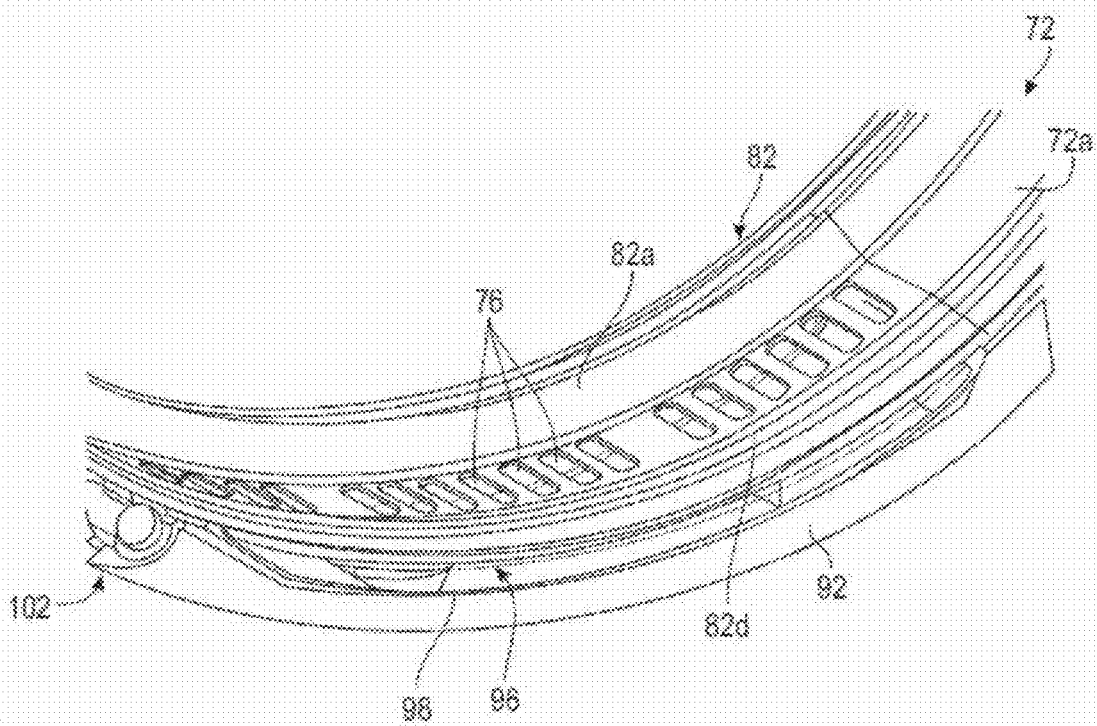

[Fig.9]
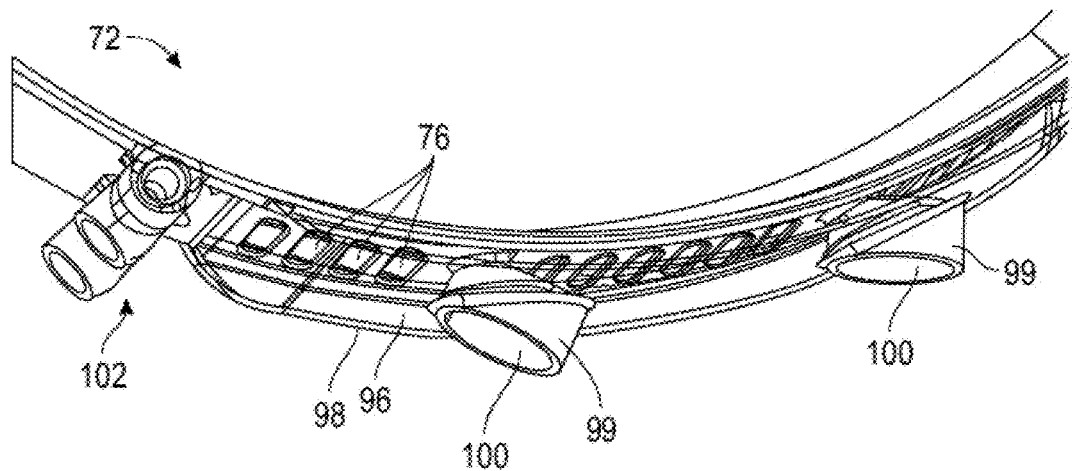
[Fig. 10]
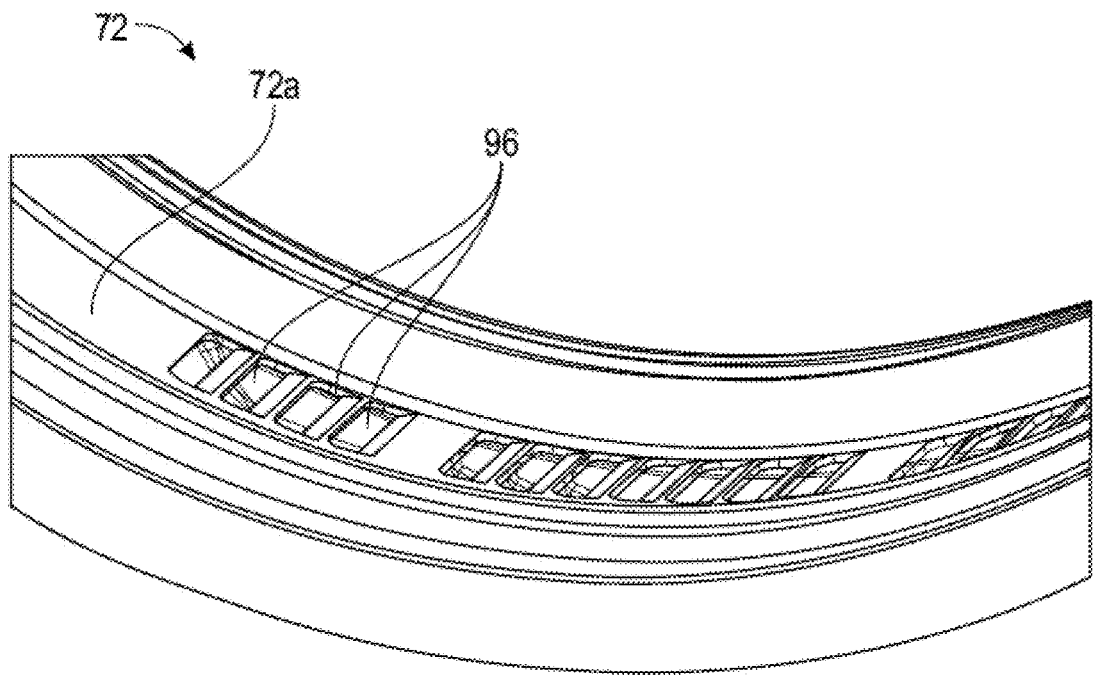

RECOVERY OF LUBRICATING OIL FROM A REDUCTION GEAR OF AN AIRCRAFT TURBINE ENGINE

TECHNICAL FIELD OF THE INVENTION

The present invention relates to the recovery and evacuation of lubricating oil from a mechanical reduction gear in an aircraft turbine engine. This invention is particularly but not exclusively applicable to a turbine engine of counter-rotating turbine.

TECHNICAL BACKGROUND

The technical background comprises in particular the documents EP-A2-2 820 280, EP-A1-3 447 243 and FR-A1-3 035 375.

Typically, an aircraft turbine engine comprises, from upstream to downstream in the flow direction of the gases, a fan, a low-pressure compressor, a high-pressure compressor, an annular combustion chamber, a high-pressure turbine and a low-pressure turbine. The rotor of the low-pressure compressor is driven by the rotor of the low-pressure turbine, and the rotor of the high-pressure compressor is driven by the rotor of the high-pressure turbine.

From an engine performance and fuel consumption point of view, it is advantageous to maximize the rotational speed of the low-pressure turbine as this allows to obtain a better efficiency of the turbine. However, increasing the rotational speed of the turbine implies increasing the centrifugal forces it undergoes, and therefore greatly complicates its design.

One suggestion for increasing the efficiency of a turbine without increasing its rotational speed consists in using a counter-rotating turbine. The low-pressure turbine is then replaced by a two-rotor turbine a first rotor of which is configured to rotate in a first rotational direction and is connected to a first turbine shaft, and a second rotor is configured to rotate in an opposite direction of rotation and is connected to a second turbine shaft. The first rotor comprises turbine wheels interposed between turbine wheels of the second rotor.

A low-pressure turbine can have a rotational speed at take-off of about 4,000 rpm in a conventional architecture where the turbine drives the fan directly or a rotational speed at take-off of about 10,000 rpm (in an architecture where the turbine drives the fan by means of a reduction gear). Its replacement by a counter-rotating turbine whose rotors turn respectively at speeds at take-off of the order of 3,000 and 7,000 revolutions per minute allows to have a relative speed of 10,000 revolutions per minute (3000+7000) while having an absolute speed in a low range of the aforementioned speed interval.

This counter-rotating turbine comprises a slow rotor and a fast rotor, the slow rotor driving the fan and the fast rotor meshing with a mechanical reduction gear with an epicyclic gear train of the planetary type whose input and output are counter-rotating (rotating ring gear, stationary planet carrier, rotating sun gear).

The reduction gear couples the fast rotor and the slow rotor, allowing thus a power transfer from the fast rotor towards the slow rotor. The higher efficiencies of a high-speed turbine are achieved by transferring a large portion of the power from the turbine towards the fan, without through a reduction gear but through a shaft.

This architecture is complex because of its mechanical integration: the mechanical reduction gear is located downstream of the turbine engine, radially inside a stator casing referred to as exhaust casing.

In addition, since the reduction gear generates a considerable energy (about 100 kW) during operation, it must be lubricated continuously to maintain an acceptable operating temperature. An oil circuit is therefore implemented to feed the reduction gear with oil. The oil evacuation is a key issue. Indeed, it must be recovered and evacuated. However, the current technology does not propose an optimal solution for oil recovery and evacuation in this restricted environment.

SUMMARY OF THE INVENTION

The present invention proposes an improvement to the technology described above, which represents a simple, effective and economical solution to the above problem.

The invention proposes an aircraft turbine engine, said turbine engine having a longitudinal axis and comprising:
  at least one first turbine rotor connected to a first turbine shaft and comprising rotor vanes located in a duct,
  an annular exhaust casing supporting at least one bearing for guiding in rotation said first shaft about the axis and comprising arms located in said duct, downstream of said vanes, and
  a mechanical reduction gear with epicyclic gear train of the planetary type which comprises a sun gear, a ring gear, and a planet carrier, the reduction gear being at least partly surrounded by said exhaust casing and one of the elements that can rotate about the axis selected from the sun gear and the ring gear of the reduction gear being connected to said first shaft,
characterised in that said exhaust casing carries a device for recovering and evacuating oil centrifugally sprayed in operation by the reduction gear, said device comprising an annular oil recovery gutter which extends around the reduction gear and which is connected to at least one oil evacuation conduit passing through one of said arms of said exhaust casing.

The invention thus proposes an oil recovery and evacuation device particularly designed for its integration in an environment comprising a mechanical reduction gear and an exhaust casing surrounding this reduction gear. The device essentially comprises two portions, referred to as an oil recovery gutter and at least one oil evacuation conduit. The gutter is interposed between the reduction gear and the exhaust casing and is intended to recover the oil centrifugally sprayed during operation, in particular through the ring gear or a ring gear carrier of the reduction gear. Each of the conduits extends from the gutter into and through an arm in order to evacuate oil from the interior of the exhaust casing radially outward. The device is therefore adapted to the specific environment mentioned above and advantageously has little or no impact on the aerodynamics of the engine.

The turbine engine according to the invention may comprise one or more of the following characteristics, taken alone from each other or in combination with each other:
  said gutter comprises a radially internal annular surface of oil reception and guiding, which is axially bordered by two annular ribs;
  the two ribs comprise a first rib formed integrally with a first annular wall, and a second rib formed integrally with a second annular wall, one of the first and second walls comprising said surface and said first and second annular walls being mounted coaxially one within the other;

said first and second walls comprise annular flanges for attachment to each other and to an annular attachment flange of said exhaust casing;

a partition extends around an angular segment of a radially external annular surface of the gutter and defines with this surface an oil recovery chamber, the gutter comprising openings opening onto said annular surfaces for fluidly communicating said chamber with an inter-rib space, and said partition comprising at least one orifice connected to said at least one conduit for evacuating recovered oil into said chamber;

said at least one orifice is formed in a boss of the partition;

said device comprises two oil evacuation conduits and said partition comprises two orifices connected to these two conduits respectively;

said chamber is passed-through by a vertical plane passing through said axis;

said orifices are located on either side of said plane;

the orifices are spaced from each other at an angle allowing to ensure that oil is evacuated throughout the flight envelope (all attitudes of the plane);

the orifices are spaced apart from each other by an angle of less than or equal to 120°, measured about said axis;

said at least one conduit is inclined with respect to a plane passing through said axis;

said gutter is surrounded by an annular thermal insulation coating;

an annular airflow space is maintained between said coating and said exhaust casing;

said chamber has an angular extent about said axis of between 10 and 90°;

the or each boss is configured to ensure directly, or by means of a seal, a fluidic connection with the corresponding conduit;

in the case where several conduits evacuate oil, these conduits are connected to a same pump;

the or each conduit has any shape in cross-section, for example elliptical;

the turbine engine is of the type with external counter-rotating propellers, which can be shrouded or not shrouded;

the turbine engine is of the type with a single shrouded fan;

the turbine engine is of the counter-rotating turbine type, the first rotor being configured to rotate in a first direction of rotation, the turbine engine comprising a second rotor configured to rotate in an opposite direction of rotation and connected on the one hand to a second turbine shaft and on the other hand to the other of said elements selected from the sun gear and the ring gear of the reduction gear.

BRIEF DESCRIPTION OF FIGURES

The invention will be better understood and other details, characteristics and advantages of the present invention will become clearer from the following description made by way of non-limiting example and with reference to the attached drawings, in which:

FIG. 1 is a very schematic view in axial cross-section of a turbine engine with counter-rotating turbine, FIG. 2 is another very schematic view of a turbine engine with counter-rotating turbine, FIG. 3 is a schematic view in axial cross-section of an embodiment of a turbine engine according to the invention, and shows an oil recovery and evacuation device, FIG. 4 is a very schematic view in axial cross-section of the concept of the device of FIG. 3, in particular when the turbine engine is in a particular position with respect to a horizontal plane;

FIG. 5 is a similar view to FIG. 4 when the turbine engine is in an inclined position with respect to a horizontal plane;

FIG. 6 is a schematic cross-section and larger scale view of the device in FIG. 3;

FIG. 7 is a similar view to FIG. 6, the cross-section being made in a lower portion of the turbine engine and the device;

FIG. 8 is a schematic perspective view of the lower portion of the device, in which an oil recovery chamber is located, FIG. 9 is another schematic perspective view of the lower portion of the device, and FIG. 10 is another schematic perspective view of the lower portion of the device, and illustrates an alternative embodiment.

DETAILED DESCRIPTION OF THE INVENTION

FIG. 1 shows a very schematic representation of a turbine engine 10 with counter-rotating turbine for an aircraft.

This turbine engine 10 comprises from upstream to downstream, in the flow direction of the gases, a fan 12, a low-pressure compressor 14, a high-pressure compressor 16, an annular combustion chamber 18, a high-pressure turbine 20 and a counter-rotating turbine 22.

The reference 24 designates an intermediate casing located between the compressors 14 and 16, and the reference 26 designates a turbine casing (of the TVF type, which is an acronym for Turbine Vane Frame, which designates a turbine casing equipped with arms forming straightener bladings) located between the turbines 20 and 22. Finally, the reference 28 designates an exhaust casing (of the TRF type, an acronym for Turbine Rear Frame which designates the last turbine casing). These casings form the structure of the turbine engine: they support the bearings that guide the shafts in rotation and are linked to the suspensions of the turbine engine.

The rotor of the high-pressure turbine 20 drives in rotation the rotor of the high-pressure compressor 16 via a high-pressure shaft 30, which is centred and guided in rotation by bearings, such as an upstream ball bearing 32 and a downstream roller bearing 34. The bearing 32 is mounted between an upstream end of the shaft 30 and the intermediate casing 24, and the bearing 34 is mounted between a downstream end of the shaft 30 and the turbine casing 26.

The counter-rotating turbine 22 comprises a first rotor 22*a* having wheels 22*aa* configured to rotate in a first direction of rotation and connected to a first turbine shaft 36, and a second rotor 22*b* having wheels 22*ba* configured to rotate in an opposite direction of rotation and connected to a second turbine shaft 38 and interposed between the wheels 22*aa* of the rotor 22*a* (see FIGS. 1 and 3).

Each turbine wheel comprises an annular row of vanes, each of which comprises an aerodynamic profile comprising an intrados and an extrados that meet to form a leading edge and a trailing edge of the gases in the turbine duct.

The first shaft 36 drives in rotation the fan 12 and the rotor of the low-pressure compressor 14. This first shaft 36 is furthermore meshed with a ring gear 40 of a mechanical reduction gear 42 with epicyclic gear train of planetary type.

The second shaft 38 is meshed with the sun gear 44 or planetary of the reduction gear 42. The reduction gear 42 further comprises planet gears 41 meshed with the sun gear 44 and the ring gear 40, respectively, and carried by a planet carrier 46 that is attached to the exhaust casing 28.

Each of the casings 26 and 28 generally comprises a central hub, as well as an outer annulus that surrounds the hub and is connected to the latter by a series of arms that are substantially radial to the longitudinal axis A of the turbine engine and extend through the turbine duct. The central hub of the casing 28 extends around at least one portion of the reduction gear 42.

FIG. 2 shows another turbine engine in which the elements described in the above are designated by the same references. The foregoing description applies herein insofar as it does not contradict what follows and is not contrary to what is illustrated in FIG. 2.

The differences between the turbine engines in FIGS. 1 and 2 are based in particular on the guide bearings for the shafts and rotors and on the attachment of the reduction gear to the turbine casing 26 or the exhaust casing 28.

In FIG. 2, the high-pressure shaft 30 is centred and guided in rotation by two upstream ball bearings 32 and roller bearings 33, respectively, and by a downstream roller bearing 34. The bearings 32, 33 are mounted between an upstream end of the shaft 30 and the intermediate casing 24, and the bearing 34 is mounted between a downstream end of the shaft 30 and the turbine casing 26.

In contrast to FIG. 1, the planet carrier 46 of the reduction gear 42 in FIG. 2 is attached to the turbine casing 26. The planet carrier 46 is thus connected to the turbine casing 26 by a cylindrical wall 50 which is advantageously rigid. This wall 50 passes axially through the rotors 22a, 22b and the second shaft 38.

The second shaft 38 has its downstream end meshed with the sun gear, as discussed above, and is further connected to the last stage or downstream stage of the second rotor 22b, i.e., to the last wheel of that rotor.

The second shaft 38 is centred and guided in rotation on this wall 50 by means of two guide bearings, respectively upstream 56 and downstream 58.

The first shaft 36 has its downstream end attached to the ring gear 40 of the reduction gear and its upstream end attached to the last stage or downstream stage of the first rotor 22a, i.e. the last wheel of this rotor. The ring gear 40 is also attached to the upstream end of a ring gear carrier 40a, the downstream end of which is attached to or meshed with the downstream end of the shaft 36.

The planet carrier 46 may comprise, here on the downstream side of the reduction gear 42, an annular segment having a C- or S-shaped cross-section so as to confer on the planet carrier a certain flexibility by elastic deformation, in particular in the radial direction as well as in tilting (flexibility in rotation about the axes perpendicular to the motor axis). Because of this flexibility provided by the planet carrier 46, the ring gear carrier 40a of the reduction gear 42 can be rigid. The reverse is possible, under certain conditions. In this case, the ring gear carrier 40a would be flexible or confer a flexibility, and the planet carrier 46 would be rigid. The ring gear carrier 40a would then comprise an annular segment with a cross-section shaped like a C or S so as to confer to the ring gear a certain flexibility by elastic deformation, in particular in radial as well as in tilting (flexibility in rotation around axes perpendicular to the motor axis). In this second configuration, the flexibility is advantageously integrated outside the force path from the downstream end of the ring gear carrier 40a to the bearing 60.

The shaft 36 is guided upstream by bearings 52, 54 mounted between this shaft 36 and the intermediate casing 24. A first of these bearings is, for example, an upstream roller bearing 52, and a second of these bearings is, for example, a downstream ball bearing 54. The shaft 36 is further centred and guided in rotation downstream by two guide bearings, respectively upstream 60 and downstream 62 both supported by the exhaust casing 28. These bearings are advantageously located on either side of the reduction gear 42. The invention is applicable to the turbine engines of FIGS. 1 and 2. FIG. 3 and following expand on the configuration in FIG. 2.

Indeed, FIG. 3 illustrates a more concrete embodiment of a turbine engine 10 according to the invention. In FIG. 3, all the elements already described in the above are designated by the same references.

During operation, the reduction gear 42 is lubricated and the oil that has lubricated the reduction gear must be recovered and evacuated of for recycling to prevent this oil from accumulating in the reduction gear and turning into coke due to the relatively high temperatures in this environment. The lubricating oil in the reduction gear also serves to cool it by absorbing heat. The heated oil must be evacuated and cooled in order to be reinjected into the system to evacuate the heat from the reduction gear, which cannot exceed 200° C.

The invention thus proposes to integrate an oil recovery and evacuation device 70 between the reduction gear 42 and the exhaust casing 28.

During operation, the oil is centrifuged and ends up in the ring gear 40 of the reduction gear 42. Passages 40b may be provided at the external periphery of the ring gear 40 and/or the ring gear carrier 40a so as to centrifugally spray oil onto the device 70 which is annular and extends facing these passages 40b.

The device 70 essentially comprises two portions, referred to as an annular oil recovery gutter 72 that extends around the reduction gear 42 and in particular the passages 40b, and one or more oil evacuation conduits 74 that pass through arms 28a of the exhaust casing 28.

FIGS. 4 and 5 are conceptual illustrations of the invention. The gutter 72 is shown as a simple circle centred on the axis A. The gutter 72 comprises a radially internal annular surface 72a which recovers the oil centrifuged by the reduction gear 42 and over which the oil H can flow to the lower portion of the device 70, by gravity and due to the tangential component retained by the oil. This lower portion corresponds to the area located at 6 o'clock by analogy with the dial of a clock, when the turbine engine is in normal position of use on an aircraft.

The conduits 74 extend radially outward from the gutter 72, which comprises oil passage openings 76 towards these conduits 74. The passage of oil from the openings 76 of the gutter 72 to the conduits 74 is advantageously by means of a recovery chamber 78, through a partition 98, as will be described in more detail in the following.

In the example shown where there are two conduits 74, their radially internal ends are located on either side of a vertical plane P3 passing through the axis A.

FIG. 5 allows to show that the positions of these ends are chosen so that the oil accumulated in the lower portion can continue to be evacuated in all cases of flight by the two conduits 74 when the turbine engine is tilted, and for example located in a position where the median plane P3' passing through the axis A and between the radially internal ends of the conduits 74, is inclined at an angle α with respect to the plane P3.

This angle is chosen so that in all attitudes of the flight envelope, the two conduits are flooded and can evacuate oil. This allows only one pump for both conduits.

The conduits 74 extend through the arms 28a and may be inclined with respect to planes passing through the axis A, as in the example shown. The inclination of the conduits 74 is actually dependent on the inclination of the arms 28a, as shown in FIG. 4.

The invention is naturally applicable to arms that would be straight (not inclined). The problem would be the same with straight arms, namely to limit the master torque and to make the oil recovery pass through several arms.

The arms 28a of the exhaust casing 28 are connected at their radially internal ends to a first annular shroud 28b and at their radially external ends to a second annular shroud 28c (FIGS. 3 and 4). These shrouds 28b, 28c define between them a section of the turbine duct V.

The radially external ends of the conduits 74 are connected by suitable means to a pump 80, ideally a single pump, which can be connected to an oil recycling circuit for reuse in the engine.

FIGS. 6 to 9 are more detailed and larger scale views of the device 70 in FIG. 3.

FIGS. 6 and 7 first show that the passages 40b of the ring gear carrier 40a are oriented substantially radially. They are located facing the surface 72a of the gutter 72.

In the example shown, the gutter 72 is formed by the assembly of two parts, namely two annular walls 82, 84 mounted coaxially one inside the other.

Each of its walls 82, 84 comprises an annular rib 82a, 84a projecting radially inward and these ribs 82a, 84a axially border the surface 72a. The ribs 82a, 84a channel the oil as it flows over the surface 72a.

The first wall 82 comprises the surface 72a and the rib 82a which is located upstream of that surface 72a. Here, the rib 82a is slightly inclined with respect to a plane perpendicular to the axis A, and extends from upstream to downstream radially outward.

The upstream end of the wall 82 is axially engaged in an annular gorge 86a of a member 86 attached to the exhaust casing 28. This member 86 comprises an annular flange for attachment to an upstream annular flange 28d of the exhaust casing 28. The flange 28d is located substantially in line with the leading edges 28aa of the arms 28a.

FIG. 3 shows that this member 86 can be the support of the bearing 60.

The upstream end of the wall 82 comprises an internal cylindrical surface 82a slidingly abutting a side cylindrical surface 86aa of the gorge 86a. An annular seal 88, for example with a cross-section in C, may be engaged in an annular groove formed on the surface 82a, which seal is intended to cooperate with the surface 86aa.

The upstream end of the wall 82 also comprises a radial annular surface 82b located facing an annular bottom surface 86ab of the gorge 86a. An annular seal 90, for example with an Ω cross-section, may be mounted axially between these surfaces 82b, 86ab.

The downstream end of the wall 82 comprises an annular flange 82c for attachment to a downstream annular flange 28e of the exhaust casing 28, which is located substantially in line with the trailing edges 28ab of these arms 28a.

Between the surface 72a and the flange 82c, the wall 82 comprises an internal cylindrical centring surface 82d intended to cooperate with the wall 84.

The wall 84 comprises an annular flange 84b for attachment to the flange 28e of the exhaust casing 28. The wall 84 further comprises a substantially cylindrical rim 84c facing upstream and comprising an external cylindrical surface 84d intended to cooperate with the surface 82d of the wall 82.

At its upstream free end, the wall 84 and in particular the rim 84c comprises the rib 84a. The rib 84a is located downstream of the surface 72a. Here, the rib 84a is slightly inclined with respect to a plane perpendicular to the axis A, and extends from upstream to downstream radially inward. Alternatively, it could be straight.

FIG. 3 allows to see that the wall 84 is part of the bearing support 62.

The ribs 82a, 84a axially delimit between them an annular space E for recovery and channel oil, which is closed at its external periphery by the surface 72a of the gutter 72. FIG. 6 allows to see that the ribs 84a, 84b have a minimum internal diameter D1 (measured at the level of their radially internal free ends) that is smaller than the maximum external diameter D2 of the passages 40b. If the ribs 82a, 84a were carried by a same part, the assembly of the device would be difficult or impossible. On the contrary, the assembly of the device 70 is here facilitated because it is sufficient to present the walls 82a, 84 on each side of the reduction gear 42, then to move them in axial translation one inside the other, until the flanges 82c, 84b are axially applied against each other. They can then be attached to the flange 28c.

The assembling of the gutter 72 in two portions allows to save radial space by placing the external periphery of the passages 40a, which may correspond to the external periphery of the attachment flange of the ring gear 40 and/or the ring gear carrier 40a, as close to the gutter as possible without having to integrate space to allow the assembling under the ribs 82a, 84a.

The gutter 72 comprises a radially external annular surface 72b that is surrounded by the exhaust casing 28 and in particular its shroud 28b. This surface 72b is advantageously covered with an annular thermal insulation coating 92. This coating is itself separated from the shroud 28b by an annular space 94 free of ventilation air flow.

The integration of the thermal coating 92 between the oil circuit and the duct V would not be possible if the gutter 72 were one-piece with the exhaust casing 28. Indeed, if a one-piece gutter was integrated into the casing, it would not be possible to house this insulation between the gutter and the casing. There would then be intense thermal conduction between the very hot casing (close to the duct at around 550° C.) and the oil conveying gutter (which must not exceed 240° C.).

As mentioned above, the gutter 72 advantageously comprises an oil recovery chamber 96 located at the lower portion. The sectional plane of FIG. 6 does not pass through the chamber 96, whereas the sectional plane of FIG. 7 passes through this chamber 96, and is for example the plane P3 of FIG. 4.

Advantageously, the chamber 96 is configured to ensure the tranquilization of the oil, i.e. a portion of its degassing or de-aeration in order to reduce the number of air bubbles in the oil.

The chamber 96 is delimited by an angular segment of the surface 72b and by the partition 98 which extends around this segment over a predetermined angular extent, for example between 30° and 90°, and preferably 60°.

The openings 76 in the gutter 72, discussed above, are visible in FIGS. 7 to 9, and ensure the fluidic communication between the interior of the gutter 72 and the chamber 96. The openings 76 are of any shape and for example oblong or elliptical. They are evenly distributed over the entire angular extent of the chamber 96 (FIG. 8), which is for example less than 120° about the axis A. Its angular extent is adapted to the flight envelope of the plane to ensure that the two evacuations are flooded at all times during the flight.

The number and the cross-sectional area of the openings 76 are sized to accommodate the maximum oil flow rate for lubrication of the reduction gear. In addition, the oil falling into the chamber 96 via the openings tends to de-aerate, which is beneficial to the oil recovery pump 80 (the less air in the oil, the more efficient the pump).

FIG. 10 shows an alternative embodiment in which the openings 76 are inclined and not substantially radial. For example, the openings can be shaped to ensure that the oil flowing at their level will enter into the chamber without further flow.

Protruding elements, such as flow disruptors, could additionally be present on the surface 72a. Devices such as projections downstream of the openings and small plates placed perpendicular to the gutter can be added to break the oil annulus for example. Barriers could be placed in front of the openings to block the rotating oil for example.

The partition 98, best seen in FIG. 9, comprises bosses 99 extending radially outward in which are formed orifices 100 for fluidic connection of the chamber 96 to the evacuation conduits 74. The bosses 99 and the orifices 100 have similar inclinations to the conduits 74, as discussed above in connection with FIG. 4.

FIGS. 8 and 9 further show that the gutter 72 can be equipped with a system for recovering the overflow of the chamber 96. This system 102 is preferably located in the vicinity of one of the circumferential ends of the chamber 96 or of the partition 98.

The system 102 comprises, for example, one or more evacuation ports of the overflow that open onto the surface 72a for the passage of oil through the port, without passing through the recovery chamber 96. The outlet of the port may be connected to the pump 80, by means of another conduit for example passing through another of the arms 28a of the casing 28. Using multiple ports allows oil to be evacuated in the event of overflow by bypassing the main evacuation.

The system 102, the partition 98 and thus the chamber 96 and the bosses 99, are advantageously carried by the same wall 82, which facilitates the assembly of the device 70 as described in the foregoing.

Apart from the partition 98, its bosses 99 and the flange 82c, the wall 82 has a maximum external diameter D3 greater than the internal diameter D4 of the flange 28d and less than the internal diameter D5 of the flange 28e (FIG. 6). It is therefore understood that the wall 82 is mounted inside the casing 28 by axial translation from downstream. However, FIG. 7 shows that the partition 96 and the boss are located on circumferences centred on the axis A, which have diameters D6 and D7, respectively, greater than the internal diameter D5 of the flange 28e. In order to allow the wall 82 to be mounted, it will therefore be necessary to provide a notch of complementary shape at the internal periphery of the flange 28e, so here also located at 6h.

In an alternative embodiment not shown, the number of conduits 74 of the device 70 could be different.

The use of two conduits 74 arranged in close proximity to each other allows to solve two problems:

the quantity of oil to be evacuated directly determines the size of the conduits 74: this dimension will impact the master torque of the arm 28a and therefore its aerodynamic performance. It is thus interesting to have a conduit 74 as thin as possible: in our case we choose to make pass the oil in two conduits to limit the overall dimension;

the proximity of the two arms allows to ensure that in all cases of attitude both arms will be wet, as mentioned above and shown in FIGS. 4 and 5; this avoids the problems of one of the circuits being vented and air being sucked in by the recovery pump. In fact, the two circuits come together at the outlet of the casing; this allows to have only one pump for the oil circuit.

In yet another variant not shown, the device 70 according to the invention could equip another type of turbine engine, such as a turbine engine with external counter-rotating and non-shrouded propellers (commonly referred to as open rotor).

The advantages brought by the invention are numerous and are for example:

limiting the overall radial dimension inside the casing imposed by the reduction gear and the oil recovery device;

ensuring the recovery of oil while maintaining a distance between the casing and the oil to avoid heating the oil;

ensuring the passage of oil from the chamber 96 towards the oil recovery conduits passing through the arms of the casing;

limiting the impact of the conduits on the master torque of the casing arms;

etc.

The invention claimed is:

1. An aircraft turbine engine, said turbine engine having a longitudinal axis and comprising:
at least one first turbine rotor connected to a first turbine shaft and comprising rotor vanes located in a duct,
an annular exhaust casing supporting at least one bearing for guiding in rotation said first shaft about the axis and comprising arms located in said duct, downstream of said vanes, and
a mechanical reduction gear with epicyclic gear train of the planetary type which comprises a sun gear, a ring gear, and a planet carrier, the reduction gear being at least partly surrounded by said exhaust casing and one of the elements that can rotate about the axis selected from the sun gear and the ring gear of the reduction gear being connected to said first shaft,
wherein the exhaust casing carries a device for recovering and evacuating oil centrifugally sprayed in operation by the reduction gear, said device comprising an annular oil recovery gutter which extends around the reduction gear and which is connected to at least one oil evacuation conduit which passes through one of said arms of said exhaust casing.

2. The turbine engine according to claim 1, wherein said gutter comprises a radially internal annular surface of oil reception and guiding, which is axially bordered by two annular ribs.

3. The turbine engine of claim 2, wherein the two ribs comprise a first rib formed integrally with a first annular wall, and a second rib formed integrally with a second annular wall, one of the first and second walls comprising said surface, and said first and second annular walls being mounted coaxially one within the other.

4. The turbine engine of claim 3, wherein said first and second walls comprise annular flanges for attachment to each other and to an annular attachment flange of said exhaust casing.

5. The turbine engine according to claim 2, wherein a partition extends around an angular segment of a radially external annular surface of the gutter and defines with this surface an oil recovery chamber the gutter comprising openings opening onto said annular surfaces for fluidly communicating said chamber with an inter-rib space, and said partition comprising at least one orifice connected to said at least one conduit for evacuating recovered oil into said chamber.

6. The turbine engine of claim 5, wherein said at least one orifice is formed in a boss of the partition.

7. The turbine engine according to claim 5, wherein said device comprises two oil evacuation conduits and said partition comprises two orifices connected to these two conduits respectively.

8. The turbine engine according to claim 5, wherein said chamber is passed through by a vertical plane passing through said axis.

9. The turbine engine according to claim 7, wherein said orifices are located on either side of said plane.

10. The turbine engine according to claim 1, wherein said at least one conduit is inclined with respect to a plane passing through said axis.

11. The turbine engine according to claim 1, wherein said gutter is surrounded by an annular thermal insulation coating.

12. The turbine engine according to claim 11, wherein an annular airflow space is maintained between said coating and said exhaust casing.

* * * * *